(12) United States Patent
Sakamoto et al.

(10) Patent No.: US 8,928,270 B2
(45) Date of Patent: Jan. 6, 2015

(54) ELECTRIC MOTOR SYSTEM AND MOTOR CONTROL METHOD

(75) Inventors: Shogo Sakamoto, Kanagawa (JP); Takuya Murata, Tokyo (JP); Takeo Seki, Kanagawa (JP); Hiroyuki Kiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 13/611,746

(22) Filed: Sep. 12, 2012

(65) Prior Publication Data

US 2013/0078021 A1 Mar. 28, 2013

(30) Foreign Application Priority Data

Sep. 26, 2011 (JP) .................................. 2011-209306
Oct. 27, 2011 (JP) .................................. 2011-236267

(51) Int. Cl.
| | | |
|---|---|---|
| G05B 11/42 | (2006.01) | |
| G03G 15/00 | (2006.01) | |
| G05B 11/18 | (2006.01) | |
| G03G 21/16 | (2006.01) | |

(52) U.S. Cl.
CPC .......... *G03G 15/757* (2013.01); *G03G 21/1671* (2013.01); *G05B 2219/41021* (2013.01); *G05B 2219/41321* (2013.01); *G05B 11/42* (2013.01); *G03G 21/1676* (2013.01); *G03G 21/1666* (2013.01); *G05B 11/18* (2013.01); *G03G 21/1647* (2013.01)
USPC ........... 318/610; 318/560; 318/590; 318/609; 318/638

(58) Field of Classification Search
USPC ............ 318/610, 560, 567, 568.22, 590, 595, 318/609, 638, 700, 400.09, 400.26, 437, 318/467; 399/361, 371, 167, 205, 208, 227
See application file for complete search history.

(56) References Cited

U.S. PATENT DOCUMENTS

| | | | | |
|---|---|---|---|---|
| 4,687,961 A | * | 8/1987 | Horber ........................ | 310/186 |
| 4,884,016 A | * | 11/1989 | Aiello .......................... | 318/685 |
| 5,329,195 A | * | 7/1994 | Horber et al. ............... | 310/68 B |
| 8,351,824 B2 | * | 1/2013 | Maeda ......................... | 399/167 |
| 8,452,211 B2 | * | 5/2013 | Maeda ......................... | 399/167 |
| 8,693,920 B2 | * | 4/2014 | Birumachi ................... | 399/167 |
| 2011/0266990 A1 | | 11/2011 | Murata et al. | |

FOREIGN PATENT DOCUMENTS

| | | |
|---|---|---|
| JP | 2002-120425 | 4/2002 |
| JP | 2004-005548 | 1/2004 |
| JP | 2009-089540 | 4/2009 |
| JP | 2009-145743 | 7/2009 |
| JP | 2009-148082 | 7/2009 |

\* cited by examiner

*Primary Examiner* — Bentsu Ro
*Assistant Examiner* — Thai Dinh
(74) *Attorney, Agent, or Firm* — Harness, Dickey & Pierce, P.L.C.

(57) ABSTRACT

An electric motor system includes a brushless direct-current motor, a driver circuit, a position sensor, and a control circuit. The motor has an output shaft for transmitting torque. The driver circuit supplies power to the motor according to a control signal input thereto. The position sensor measures an angular, rotational position of the motor shaft. The control circuit controls operation of the motor. The control circuit includes a position sensor terminal, a reference terminal, a differential calculator, a controller, and a gain adjuster. The position sensor terminal receives a feedback signal. The reference terminal receives a reference signal. The differential calculator generates an error signal representing a difference between the measured and targeted rotational positions. The controller generates the control signal based on the error signal through a combination of control actions. The gain adjuster is connected to the controller to adjust a gain of each control action.

16 Claims, 14 Drawing Sheets

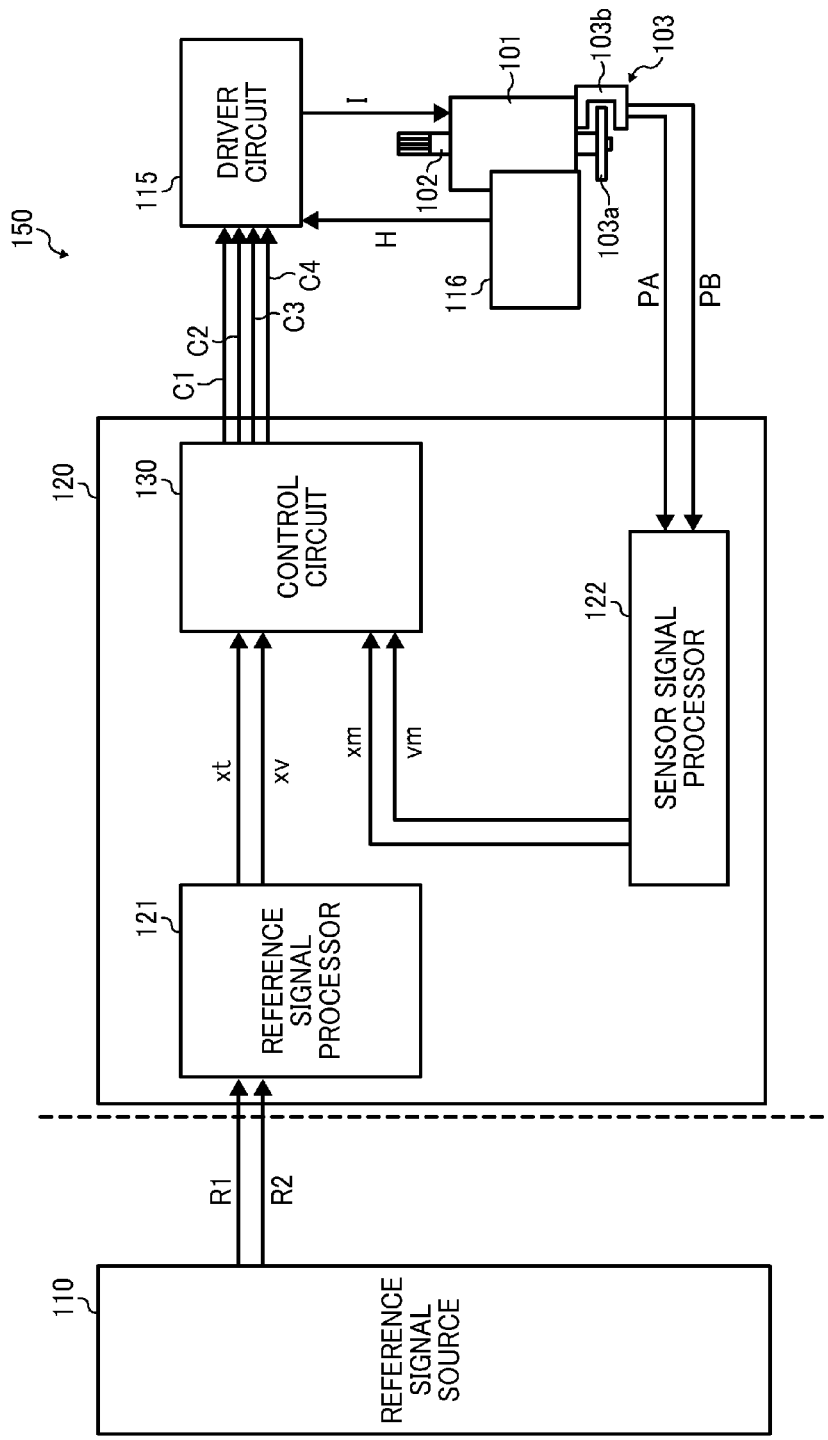

ELECTRIC MOTOR SYSTEM AND MOTOR CONTROL METHOD

CROSS-REFERENCE TO RELATED APPLICATION

This patent application claims priority pursuant to 35 U.S.C. §119 to Japanese Patent Application Nos. 2011-209306 and 2011-236267, filed on Sep. 26, 2011 and Oct. 27, 2011, respectively, the entire disclosure of each of which is hereby incorporated by reference herein.

BACKGROUND OF THE INVENTION

1. Technical Field

The present invention relates to an electric motor system and a motor control method, and more particularly, to an electric motor system employing a brushless direct-current motor (BLDC) and a method for controlling operation of a BLDC motor.

2. Background Art

In an electrophotographic image forming apparatus, such as a photocopier, facsimile machine, printer, plotter, or multifunctional machine incorporating several of those imaging functions, various pieces of motor-driven imaging equipment work in coordination with each other to perform a sequential electrophotographic process.

Different types of electric motors are employed in imaging applications depending on their own merits. Among these, brushless direct-current (BLDC) motors with electronic control circuitry increasingly replace stepper motors and conventional brushed motors owing to their high energy efficiency and light-weight construction. In particular, the brushless configuration of the BLDC motor is superior to its brushed counterpart in terms of durability due to the absence of wear and tear caused by friction with a commutator brush.

Some BLDC motor systems incorporate a feedback controller including a position sensor, such as a rotary encoder, for measuring an actual position and speed of the motor. Such a position sensor may be disposed directly on an output shaft of the motor, or otherwise on a load device connected to the motor shaft. Providing the position sensor on the motor shaft, as opposed to that on the load device, allows for a simple control circuit, as it does not require a complicated model accounting for displacement of the load device per revolution of the motor shaft. Also, the shaft-mounted sensor eliminates the need for modifications to the control circuitry where changes are made to the power transmission and the load device, or where a single motor is adapted from one place to another in the imaging equipment.

One problem associated with feedback control circuitry in a BLDC motor system is the difficulty in stabilizing operation of the motor in a hold state thereof in which the motor stops rotation while being energized. The problem arises where the feedback controller, detecting a difference between the targeted and measured positions of the motor shaft upon entry of the motor into the hold state, performs a corrective action in an attempt to reduce the positional error, resulting in oscillatory movement of the motor moving back and forth a slight distance corresponding to a number of pulses by which the measured position signal is shifted from the targeted position signal.

Oscillations of the motor would adversely affect coordination between motor-driven moving parts, such as those in the paper conveyance mechanism, as they propagate throughout the surrounding structure of the image forming apparatus. Also, irregular movement of the motor in the hold state causes accelerated wear and tear on the load device connected to the motor shaft, resulting in deteriorated performance of the imaging equipment.

To date, various techniques have been proposed to provide a reliable electric motor system for use in an image forming apparatus.

For example, one such technique employs a proportional, integral, and derivative (PID) controller that directs a driver circuit to supply an electric current to a BLDC motor. According to this method, the controller adjusts a gain of PID control depending on a difference between a reference pulse signal and a driving pulse signal representing desired and actual rotational speeds of the motor, respectively.

Another technique provides a dual control system for a BLDC motor, employing a combination of a PID controller and a sliding-mode controller, which can selectively perform PID control and sliding-mode control depending on a rotational speed of a load device being driven with the motor driver. According to this method, the PID controller is provided with a gain adjustment capability which reduces a gain of PID control progressively toward zero in response to switching of the control mode from the PID control to the sliding-mode control.

Although generally successful for their intended purposes, the techniques described above do not effectively stabilize operation of a BLDC motor in the hold state. That is, adjusting a controller gain depending on a differential speed, though effective for optimizing the controller gain to control the motor in the steady operational state, does not address the problem of motor oscillations in the hold state. Also, the dual control system cannot immediately stop oscillations of the motor in the hold state, where it takes time to attenuate the gain to zero after the control mode switches from the PID control to the sliding-mode control.

SUMMARY OF THE INVENTION

Exemplary aspects of the present invention are put forward in view of the above-described circumstances, and provide a novel electric motor system.

In one exemplary embodiment, the electric motor system includes a brushless direct-current motor, a driver circuit, a position sensor, and a control circuit. The motor has an output shaft for transmitting torque. The motor rotates at a given rotational speed in a steady operational state thereof, and stops rotation while being energized in a temporary, hold state thereof. The driver circuit is connected to the motor to supply power to the motor according to a control signal input thereto. The position sensor is disposed adjacent to the motor to measure an angular, rotational position of the motor shaft. The control circuit is connected between the position sensor and the driver circuit to control operation of the motor. The control circuit includes a position sensor terminal, a reference terminal, a differential calculator, a controller, and a gain adjuster. The position sensor terminal is connected to the position sensor to receive a feedback signal indicating the measured rotational position of the motor shaft. The reference terminal is connected to a reference signal source to receive a reference signal indicating a targeted rotational position of the motor shaft. The differential calculator is connected to the position sensor terminal and the reference terminal to generate an error signal representing a difference between the measured and targeted rotational positions of the motor shaft based on the feedback signal and the reference signal. The controller is connected to the differential calculator to generate the control signal based on the error signal through a combination of control actions, including at least a proportional action and an integral action employing a proportional gain and an integral gain, respectively. The gain adjuster is connected to the controller to adjust the gain of each control action to a first value where the motor is in the steady operational state thereof, and to a second value different from the first value where the motor is in the hold state thereof.

Other exemplary aspects of the present invention are put forward in view of the above-described circumstances, and provide a novel method for controlling operation of a brushless direct-current motor.

In one exemplary embodiment, the motor has an output shaft for transmitting torque, the motor rotating at a given rotational speed in a steady operational state thereof, and stopping rotation while being energized in a hold state thereof. The method includes the steps of measurement acquisition, target acquisition, difference calculation, signal generation, power supply, and gain adjustment. The measurement acquisition step acquires a measured rotational position of the motor shaft. The target acquisition step acquires a targeted rotational position of the motor shaft. The difference calculation step calculates a difference between the measured and targeted rotational positions of the motor shaft. The signal generation step generates a control signal based on the calculated difference through a combination of control actions, including at least a proportional action and an integral action employing a proportional gain and an integral gain, respectively. The power supply step supplies power to the motor according to the control signal. The gain adjustment step adjusts the gain of each control action to a first value where the motor is in the steady operational state thereof, and to a second value different from the first value where the motor is in the hold state thereof.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description when considered in connection with the accompanying drawings, wherein:

FIG. 5 is a block diagram of control circuitry included in the BLDC motor system of FIG. 2;

DETAILED DESCRIPTION OF THE INVENTION

Figure 1:
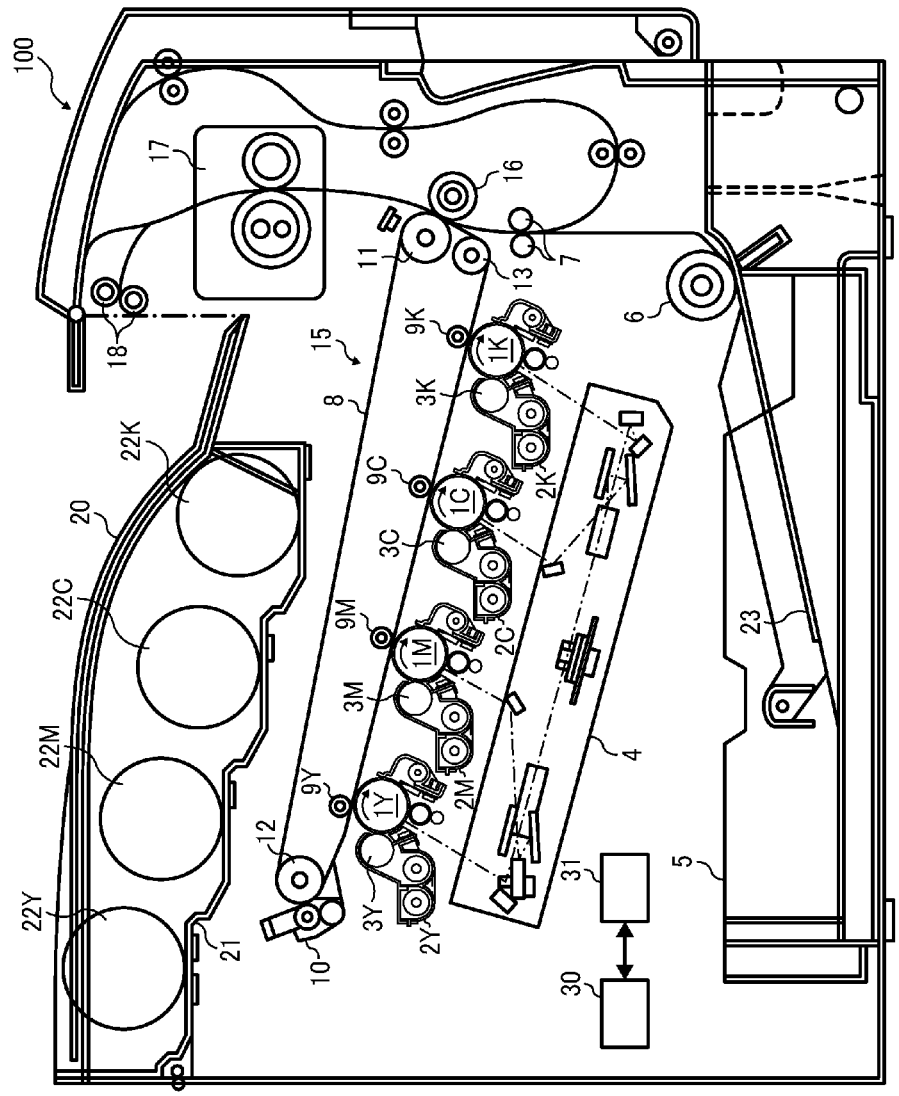
FIG. 1 schematically illustrates an image forming apparatus according to one or more embodiments of this patent specification.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

FIG. 1 schematically illustrates an image forming apparatus 100 according to one or more embodiments of this patent specification.

As shown in FIG. 1, the image forming apparatus 100 is a tandem color printer including four drum-shaped photoconductors 1Y, 1M, 1C, and 1K arranged in series, each defining an outer, photoconductive surface for forming an image thereon with toner of a particular primary color, as designated by the suffixes "Y" for yellow, "M" for magenta, "C" for cyan, and "K" for black. An exposure device 4 is disposed with a light source directed to the photoconductors 1 to irradiate the photoconductive surfaces with light to form electrostatic latent images thereon. Four development devices 2Y, 2M, 2C, and 2K are located adjacent to the photoconductors 1Y, 1M, 1C, and 1K, respectively, to render the electrostatic latent images into visible, toner images.

At the bottom of the apparatus 100 is a sheet cassette 5 in which a stack of recording media, such as sheets of paper 23, is accommodated. A motor-driven, sheet feed roller 6 is disposed in contact with the uppermost one of the sheet stack 23 to introduce it into a sheet conveyance path defined by conveyance rollers, such as a pair of motor registration rollers 7 and a pair of output rollers 18, along which the sheet 23 is conveyed from the sheet cassette 5 to a sheet stacker 20 disposed outside and atop the apparatus body.

Located above the photoconductors 1 is an intermediate transfer unit 15 including an endless, intermediate transfer belt 8 entrained around four electrically biased, primary transfer rollers 9Y, 9M, 9C, and 9K, as well as electrically grounded rollers, including a secondary transfer backup roller 11, a cleaning backup roller 12, and a tension roller 13.

Each of the primary transfer rollers 9 is disposed opposite an associated one of the photoconductors 1 via the belt 8 to define a primary transfer nip therebetween, at which the toner image is transferred from the photoconductive surface to the belt surface. A secondary transfer roller 16 is disposed opposite the backup roller 11 via the belt 8 to define a secondary transfer nip therebetween, at which the toner image is transferred to the recording medium 23 from the belt surface downstream from the primary transfer nips. A belt cleaner 10 is disposed opposite the backup roller 12 via the belt 8 to clean the belt surface of residual toner downstream from the secondary transfer nip.

The intermediate transfer belt 8 is retained in contact with the photoconductors 1 at the primary transfer nip, while equipped with a suitable positioning mechanism which moves the belt 8 against and away from the photoconductive surface where adjustment is required.

A removably installed, fixing device 17 is disposed adjacent to the secondary transfer nip, which includes a pair of fixing rollers pressed against each other to define a fixing nip therebetween, through which the recording sheet 23 is passed to fix the toner image with heat and pressure.

Between the intermediate transfer unit 15 and the sheet stacker 20 is a bottle support rack 21 in which a plurality of bottles 22Y, 22M, 22C, and 22K accommodating toner of a particular primary color is removably installed, apart from the development devices 2. A toner supply mechanism is provided to connect each of the toner bottles 22 to an associated one of the development devices 2 to supply fresh toner to the developer where required.

In addition to those structural components, the image forming apparatus 100 also includes a central controller 30 including a central processing unit (CPU) and a memory 31 for storing computer programs executed by the controller 30 as well as various types of information employed for image formation control. A control panel may be provided at a suitable portion of the apparatus body, which allows a user to input a request or command according to which the controller 30 executes a specific program to control operation of the imaging equipment.

Although not specifically shown in FIG. 1, the image forming apparatus 100 incorporates rotary drivers to rotate several rotatable members included various pieces of the imaging equipment.

For example, the photoconductive drum 1 is a motor-driven cylindrical body that rotates clockwise in the drawing to advance its photoconductive surface to a sequential imaging process. The exposure device 4 includes a motor-driven polygon mirror which rotates its mirrored facets reflecting a laser beam from the light source toward the photoconductive surface via an optical assembly of lenses and mirrors. Each development device 2 includes a developer roller 3 that rotates in a rotational direction opposite that of the photoconductor 1 to apply toner to the photoconductive surface.

Also, in the sheet conveyance path, the feed roller 6 is driven to rotate in a given rotational direction counterclockwise in the drawing. Each of the registration roller pair 7 and the output roller pair 18 is driven to rotate in a given rotational direction, one counterclockwise and the other clockwise in the drawing.

Further, in the intermediate transfer unit 15, a rotary driver is provided to at least one of the belt supporting rollers, such as, for example, the secondary transfer backup roller 11, which in turn causes the belt 8 to rotate in a given rotational direction counterclockwise in the drawing.

According to this patent specification, the image forming apparatus 100 incorporates an electric, brushless direct current (BLDC) motor system 150 which serves as a rotary driver to drive those rotary members, such as the feed roller 6, the registration roller 7, the secondary transfer backup roller 11, and the output roller 18, as well as those included in the photoconductor 1, the exposure device 4, and the development device 2. A description will be given of the BLDC motor system 150 with reference to FIG. 2 and subsequent drawings.

During operation, each of the four photoconductor drums 1 rotates to forward its outer, photoconductive surface to a sequential electrophotographic process, including charging, exposure, development, transfer, and cleaning, in one rotation of the photoconductor drum 1.

First, the photoconductive surface is uniformly charged by a charging device and subsequently exposed to a modulated laser beam emitted from the exposure unit 4. The laser exposure selectively dissipates the charge on the photoconductive surface to form an electrostatic latent image thereon according to image data representing a particular primary color. Then, the latent image enters the development device 2 which renders the incoming image visible using toner. The toner image thus obtained is forwarded to the primary transfer nip between the intermediate transfer belt 8 and the primary transfer roller 9.

At the primary transfer nip, the primary transfer roller 9 on the inside of the belt loop is supplied with a bias voltage of a polarity (for example, a positive bias) opposite that of the toner on the photoconductor drum 1. This electrostatically transfers the toner image from the photoconductive surface to an outer surface of the belt. Such transfer process occurs sequentially at the four transfer nips along the belt travel path, so that toner images of different colors are superimposed one atop another to form a single composite color image on the surface of the intermediate transfer belt 8.

After primary transfer, the intermediate transfer belt 8 forwards the toner image to the secondary transfer nip between the transfer backup roller 11 and the secondary transfer roller 16.

Meanwhile, in the sheet conveyance path, the feed roller 6 rotates to introduce a recording sheet 23 from the sheet cassette 5 toward the pair of registration rollers 7 being rotated. Upon receiving the fed sheet S, the registration rollers 7 stop rotation to hold the incoming sheet 23 therebetween, and then advance it in sync with the movement of the intermediate transfer belt 8 to the secondary transfer nip. At the secondary transfer nip, the toner image is transferred from the belt 8 to the recording sheet 23, upon which the multicolor image is reproduced with a full range of colors as it appears on a white or opaque background of the recording medium.

After secondary transfer, the intermediate transfer belt 8 enters the belt cleaner 10, which removes and collects residual toner from the intermediate transfer belt 8. At the same time, the recording sheet 23 bearing the powder toner image thereon is introduced into the fixing device 17, which fixes the multicolor image in place on the recording sheet 23 with heat and pressure through the fixing nip.

Thereafter, the recording sheet 23 is ejected by the output rollers 18 to the sheet stacker 20 outside the apparatus body, which completes one operational cycle of the image forming apparatus 100.

Figure 2:
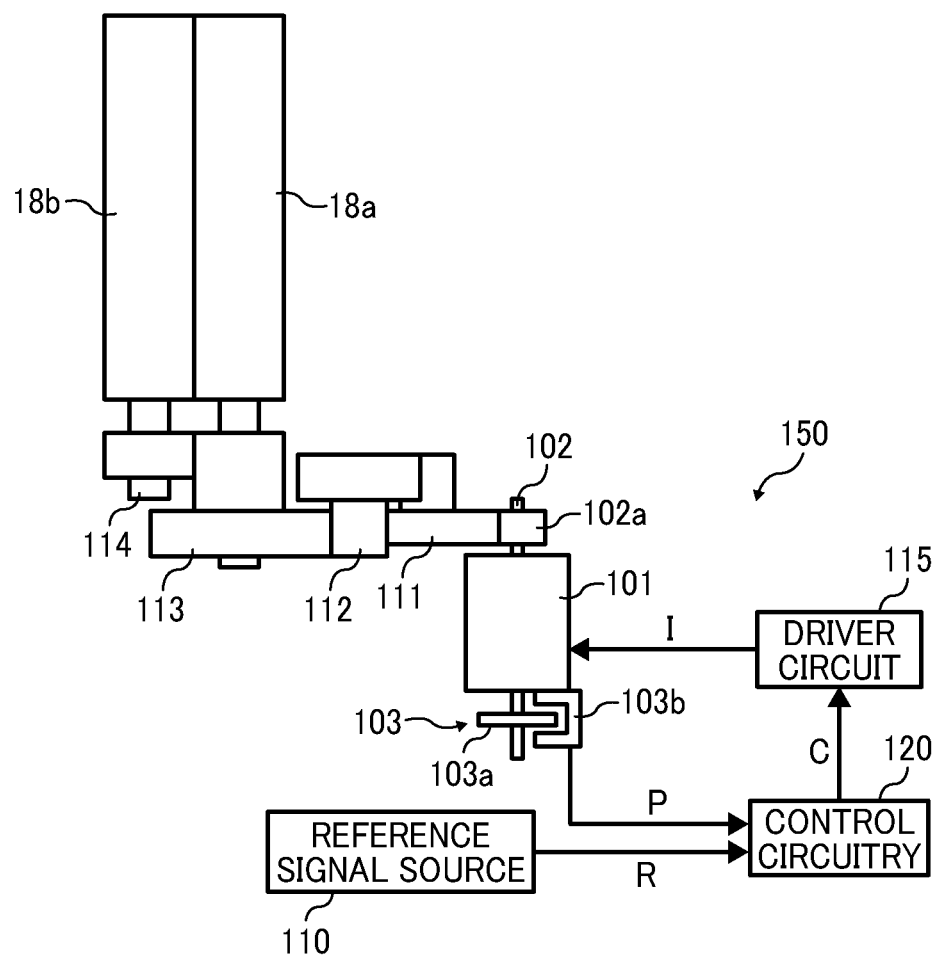
FIG. 2 is a schematic view of a brushless direct-current (BLDC) motor system incorporated in the image forming apparatus of FIG. 1.

FIG. 2 is a schematic view of the BLDC motor system 150 incorporated in the image forming apparatus 100.

As shown in FIG. 2, the BLDC motor system 150 includes a BLDC motor 101 having an output shaft 102 for transmitting torque to a load device, for example, the pair of output rollers 18a and 18b disposed at the sheet conveyance path to output recording sheets 23 to the sheet stacker 20. The output shaft 102 of the motor 101 is connected to the roller pair 18 via an input gear 102a provided on the shaft 102 and a gear train formed of first through fourth reduction gears 111 through 114 meshing each other between the gear 102a and the roller shafts.

The system 150 also includes a driver circuit 115 connected to the motor 101 to supply power to the motor 101 according to a control signal input thereto, a position sensor 103 disposed adjacent to the motor 101 to measure an angular, rotational position of the motor shaft 102, and control circuitry 120 connected to the driver circuit 115 and the position sensor 103. A reference signal source 110, which may be either internal or external to the system 150, is connected to the control circuitry 120.

During operation, the motor 101 rotates its output shaft 102 to impart torque via the gear 102a and the reduction gears 111 through 114 to rotate the output rollers 18a and 18b. The output roller pair 18a and 18b thus actuated advances a recording sheet 23 entering a nip defined therebetween to output it to the sheet stacker 20 from the sheet conveyance path.

Meanwhile, the reference signal source 110 outputs a reference signal R to the control circuitry 120, which indicates a rotational direction and distance of the motor 101 according to a targeted control sequence. The position sensor 103 monitors rotation of the motor shaft 102 to output a pulsed sensor signal P to the control circuitry 120.

Based on the sensor signal P, the control circuit 120 calculates an actual speed and distance of the motor rotation to obtain a speed and angular position of the rollers 18a and 18b, from which a speed and position of the recording medium 23 being conveyed are deduced. The control circuitry 120 generates a control signal C according to the pulse signal P from the position sensor 103 and the reference signal R from the reference signal source 110.

The control signal C thus generated is transmitted to the driver circuit 115, which supplies power or electric current I to the motor 101 according to the input signal C, thereby driving the roller pair 18a and 18b to rotate at a proper rotational speed.

Figure 3B:
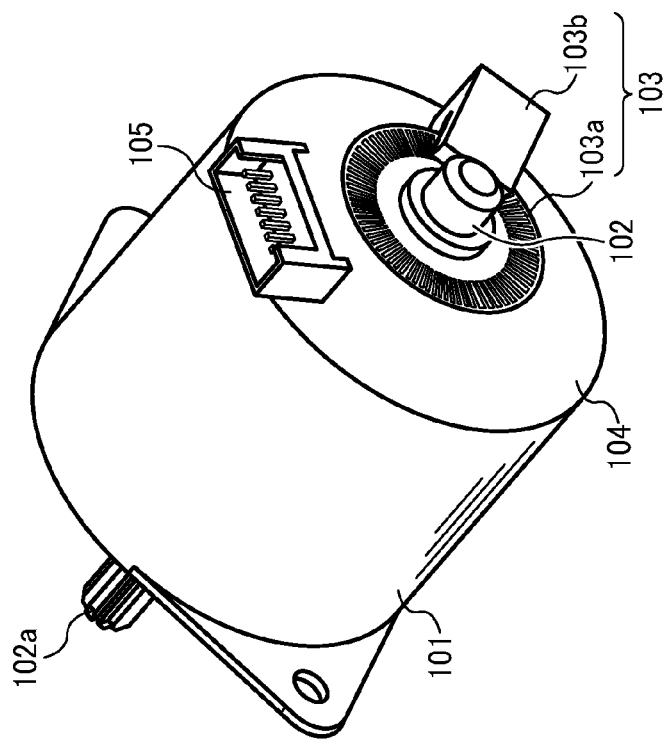
FIGS. 3A and 3B are perspective views from opposite ends of a BLDC motor included in the system of FIG. 2.
Figure 3A:
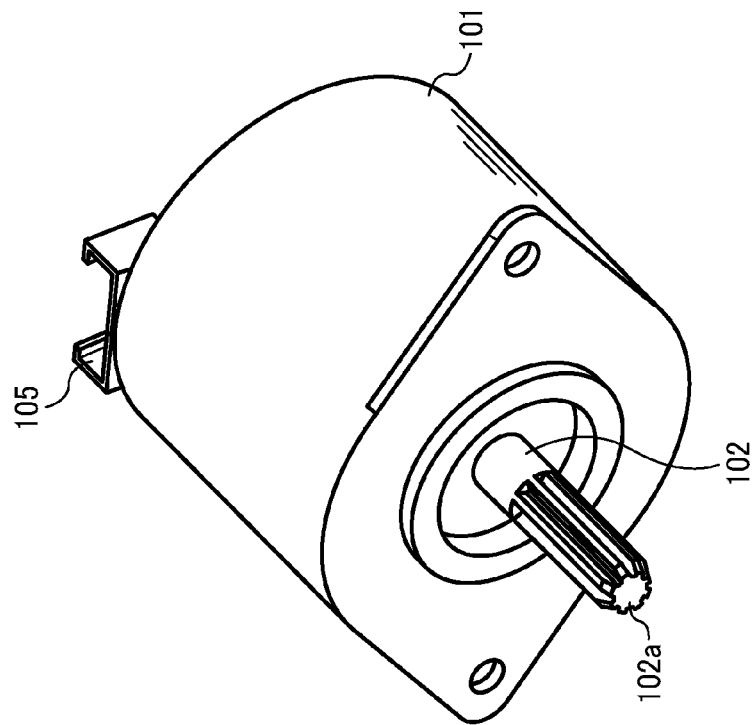

With additional reference to FIGS. 3A and 3B, which are perspective views from opposite ends of the BLDC motor 101, the motor 101 is shown having its output shaft 102 defining a toothed surface for meshing with the reduction gear 111 at one end of the motor 101. The gear 102a thus formed by cutting teeth on the motor shaft 102, as opposed to a separate gear attached to the motor shaft, effectively increases a reduction ratio at an initial stage of the gear train, while allowing for a reduced cost in producing the geared motor assembly.

Also, the output shaft 102 of the motor 101 may be provided with a rolling-element bearing, such as a ball bearing. Using a rolling element at the bearing surface allows for a reduced friction and therefore high efficiency and high durability of the DC motor assembly, compared to that possible with a plain bearing, such as a sintered metal bearing.

At the end opposite the gear end of the motor 101 is a substrate 104 upon which the position sensor 103 is disposed. An electrical connector 105 is disposed on the substrate 104 to provide signal communication between the motor 101 and the position sensor 103. Although not depicted in the drawing, the driver circuit 115 may be mounted to the substrate 104, which eliminates the need for an extra harness or wiring assembly to connect the driver and motor electronics, leading to an inexpensive configuration of the system 150.

The position sensor 103 comprises a dual-channel optical rotary encoder disposed on the substrate 104 of the motor 101, consisting of an encoder disc 103a with radial grating lines around its periphery, and a photosensor 103b consisting of two pairs of light emitting and detecting elements disposed opposite each other via the encoder disc 103a. The encoder disc 103a is positioned concentrically with and perpendicular to the motor shaft 102 opposite that at which the gear 102a is provided, and is secured to the motor shaft 102 so as to co-rotate with the shaft 102 upon activation of the motor 101. The photosensor 103b is mounted to the motor substrate 104.

Figure 4A:
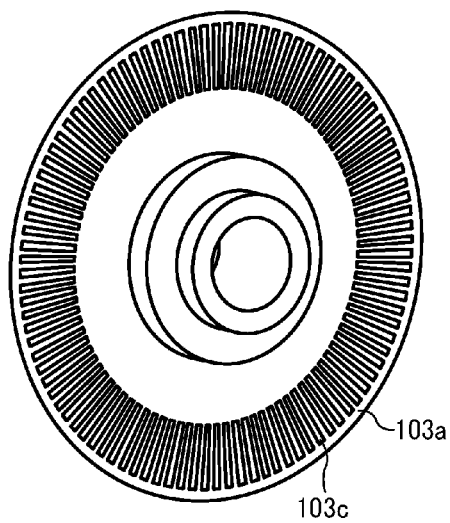
FIGS. 4A and 4B are perspective views of exemplary encoder discs employed in a position sensor included in the system of FIG. 2.
Figure 4B:
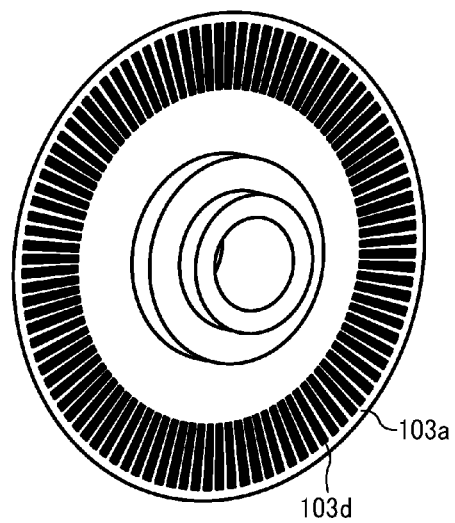

FIGS. 4A and 4B are perspective views of exemplary encoder discs 103a employed in the rotary encoder 103.

As shown in FIG. 4A, the encoder disc 103a may be configured as a circular metal plate having a plurality of equally spaced radial slits 103c formed by etching on the periphery of the circular plate. In such cases, depending on the absence and presence of the radial slits 103c, the encoder disc 103a interrupts or passes a light beam between the light emitter and detector of the photosensor 103b, which creates a series of pulses recording the motion of the encoder disc 103a.

Alternatively, as shown in FIG. 4A, the encoder disc 103a may instead be configured as a photo-etched, circular film having a radial pattern 103d printed with black or other marking material on the periphery of the circular film. In such cases, depending on the absence and presence of the radial pattern 103d, the encoder disc 103a interrupts or passes a light beam between the light emitter and detector of the photosensor 103b, or otherwise causes changes in the amount of light reaching the detector from the light emitter, which creates a series of pulses recording the motion of the encoder disc 103a. The color of the radial pattern 103d is not limited to black, as long as the marking material either partially or completely intercepts light directed to the encoder disc 103a.

During operation, as the encoder disc 103a rotates with the motor shaft 102, a light beam directed from the emitter to the detector of the photosensor 103b is periodically intercepted by the grating lines on the disc 103a, resulting in the pulsed output signal P indicating the speed and distance of the rotating motor shaft.

The two emitter and detector pairs of the photosensor 103b are mounted such that the resultant pulse signals are shifted from each other by a predetermined phase or electrical angle, which allows the control circuitry 120 to detect a rotational direction of the disc 103a through processing of the phase-shifted signals. In the present embodiment, the phase shift between the two pulse signals is $\pi/2$ radians.

The pulse count or number of pulses created per revolution of the encoder disc 103a is set to a suitable number depending on a specific configuration. For a cost-efficient configuration of motor shaft rotation detection, the pulse count may be set to a number not exceeding 200. Also, for allowing easy adaptation from a stepper motor to an inner-rotor BLDC motor, the pulse count may be set to positive integer multiples of 12 or of 50. In the present embodiment, the pulse count of the encoder disc 103a is set to 100.

FIG. 5 is a block diagram of the control circuitry 120 included in the BLDC motor system 150.

As shown in FIG. 5, and as mentioned earlier, the system 150 includes the BLDC motor 101 having the motor shaft 102 for transmitting torque, the driver circuit 115 connected to the motor 101 to supply power to the motor 101 according to a control signal input thereto, the position sensor or encoder 103 formed of the encoder disc 103a and the photosensor 103b disposed on the motor 101 to measure an angular, rotational position of the motor shaft 102, and the control circuitry 120 connected to the driver circuit 115 and the position sensor 103. The reference signal source 110 in the present embodiment is included in the main controller 30 of the image forming apparatus 100.

Specifically, the control circuitry 120 includes a reference signal processor 121 connected to the reference signal source 110; a sensor signal processor 122 connected to the position sensor 103; and a control circuit 130 connected to the signal processors 121 and 122 and the driver circuit 115. Components of the control circuitry 120 may be implemented using an integrated, single-chip microcontroller, including a central processing unit (CPU) and its associated memory devices storing computer programs and data required for program execution.

In the control circuitry 120, the sensor signal processor 121 receives reference information from the reference signal source 110, including a direction signal R1 representing a target rotational direction in which to rotate the motor shaft 102, and a distance signal R2 representing a target rotational distance or pulse count by which to rotate the motor shaft 102, as dictated by a specified motor control sequence.

Based on the information input from the reference signal source 110 as well as timing information input from an oscillator, the reference signal processor 121 generates a speed reference signal vt representing a targeted rotational speed in terms of number of revolutions per unit time to be made by the motor shaft 102, and a position reference signal xt representing a targeted rotational position in terms of cumulative distance to be travelled by the motor shaft 102. The reference signals vt and xt thus generated are transmitted to the control circuit 130.

The sensor signal processor 122 receives a pair of pulse signals PA and PB from the dual-channel rotary encoder 103, each of which pulse signal is phase-shifted from each other by $\pi/2$ radians to allow for detection of rotational direction through processing of the phase-shifted signals.

Based on the information input from the position sensor 103 as well as timing information input from an oscillator, the sensor signal processor 122 generates a speed feedback signal vm representing a measured rotational speed in terms of number of revolutions per unit time made by the motor shaft 102, and a position feedback signal xm representing a measured rotational position in terms of cumulative distance travelled by the motor shaft 102. The feedback signals vm and xm thus generated are transmitted to the control circuit 130.

Upon receiving the reference signals vt and xt and the feedback signals vm and xm, the control circuit 130 performs necessary adjustment to control signals C output to the driver circuit 115, so as to cause the speed feedback signal vm to match the speed reference signal vt, and the position feedback signal xm to match the position reference signal xt. The control signals output to the driver circuit 115 include, for example, a pulse-width modulation (PWM) output signal C1, rotational direction control signal C2, start/stop control signal C3, and braking control signal C4.

The driver circuit 115 is configured as a quadrature driver. A Hall-effect sensor 116, such as one implemented with an integrated circuit (IC), may be attached to the motor 101 to output a Hall signal H indicating a sensed rotor position of the motor 101 to the driver circuit 115. According to the control signals C and the Hall signal H, the driver circuit 115 controls the amplitude of the PWM voltage and the current supply to the motor 101.

Thus, in the BLDC motor system 150, the control circuitry 120 processes the reference information to obtain a target number of revolutions per unit time to be made by the motor shaft 102, and a target cumulative distance to be travelled by the motor shaft 102, while processing the sensor output information to obtain a measured number of revolutions per unit time made by the motor shaft 102, and a measured cumulative distance travelled by the motor shaft 102. After processing the reference information and the sensor output information, the control circuitry 120 then adjusts the control signals C output to the driver circuit 115, so as to match the measured rotational speed and position with the targeted rotational speed and position, respectively, thereby controlling the motor 101 to rotate at a proper rotational speed in a proper rotational position according to the motor control sequence.

In such a configuration, the BLDC motor 101 is operable in different operational states: a steady operational state in which the motor 101 rotates at a rated rotational speed; a ramp-down state in which the rotational speed of the motor 101 gradually decreases from the rated speed toward zero; a temporary, hold state in which the motor 101 stops rotation at a fixed angular position while being energized; and a ramp-up state in which the rotational speed of the motor 101 gradually increases from zero to the rated speed.

One problem encountered in a conventional BLDC motor system that employs a feedback control to control operation of a BLDC motor is the difficulty in stabilizing operation of the motor in a hold state thereof where the actual behavior of the motor is slightly different from that dictated by a desired control sequence, causing a difference between the targeted and measured positions of the motor shaft.

Figure 6:
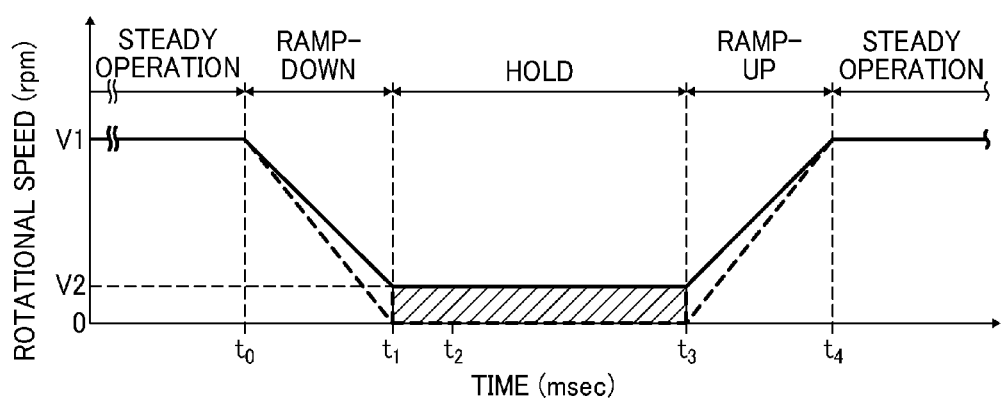
FIG. 6 is a graph showing a measured rotational speed, in revolutions per minute (rpm), of a BLDC motor, obtained in a BLDC motor system.

FIG. 6 is a graph showing a measured rotational speed (solid line), in revolutions per minute (rpm), of a BLDC motor, plotted along with a targeted rotational speed (broken line), obtained in a conventional BLDC motor system, wherein the motor changes its operational state from the steady operational state to the ramp-down state and then to the hold state, and from the hold state to the ramp-up state and then to the steady operational state.

As shown in FIG. 6, before time t0, the motor in the steady operational state rotates at a rated constant speed V1. At time t0, the motor switches from the steady operational state to the ramp-down state in which the rotational speed of the motor gradually decreases from the rated speed V1 toward zero. At time t1, the motor reaches the hold state with its rotational speed remaining at a level V2 slightly higher than zero where a small difference exists between the targeted and measured positions of the motor shaft.

In the conventional system, a feedback controller may perform a corrective action in an attempt to reduce the difference between the targeted and measured positions of the motor shaft while the motor remains in its hold state. However, where the positional error does not diminish properly, the corrective action of the feedback controller in turn causes the motor power supply to fluctuate, resulting in oscillatory movement of the motor moving back and forth a slight distance corresponding to a number of pulses by which the measured position signal is shifted from the targeted position signal.

As indicated by a shaded portion in the graph of FIG. 6, in the present case, the controller fails to remove the positional error, resulting in the motor rotational speed never reaching zero throughout the hold state of the motor. Thus, the oscillations of the motor continue until the motor enters the ramp-up state in which the motor rotational speed gradually increases (time t3), and then the steady operational state in which the motor rotational speed reaches the original, rated speed V1 (time t4).

Oscillations of the motor would adversely affect coordination between motor-driven moving parts, such as those in the paper conveyance mechanism, as they propagate throughout the surrounding structure of the image forming apparatus. Also, irregular movement of the motor in the hold state causes accelerated wear and tear on the load device connected to the motor shaft, resulting in deteriorated performance of the imaging equipment.

To counteract these and other problems of a conventional electric motor system, the control circuit 130 of the BLDC motor system 150 according to this specification incorporates a gain adjustment capability which adjusts a gain or tuning parameter of a control action depending on the operational state of the BLDC motor 101, so as to stabilize operation of the motor 101 in the hold state in the presence of a difference between the targeted and measured positions of the motor shaft.

Figure 7:
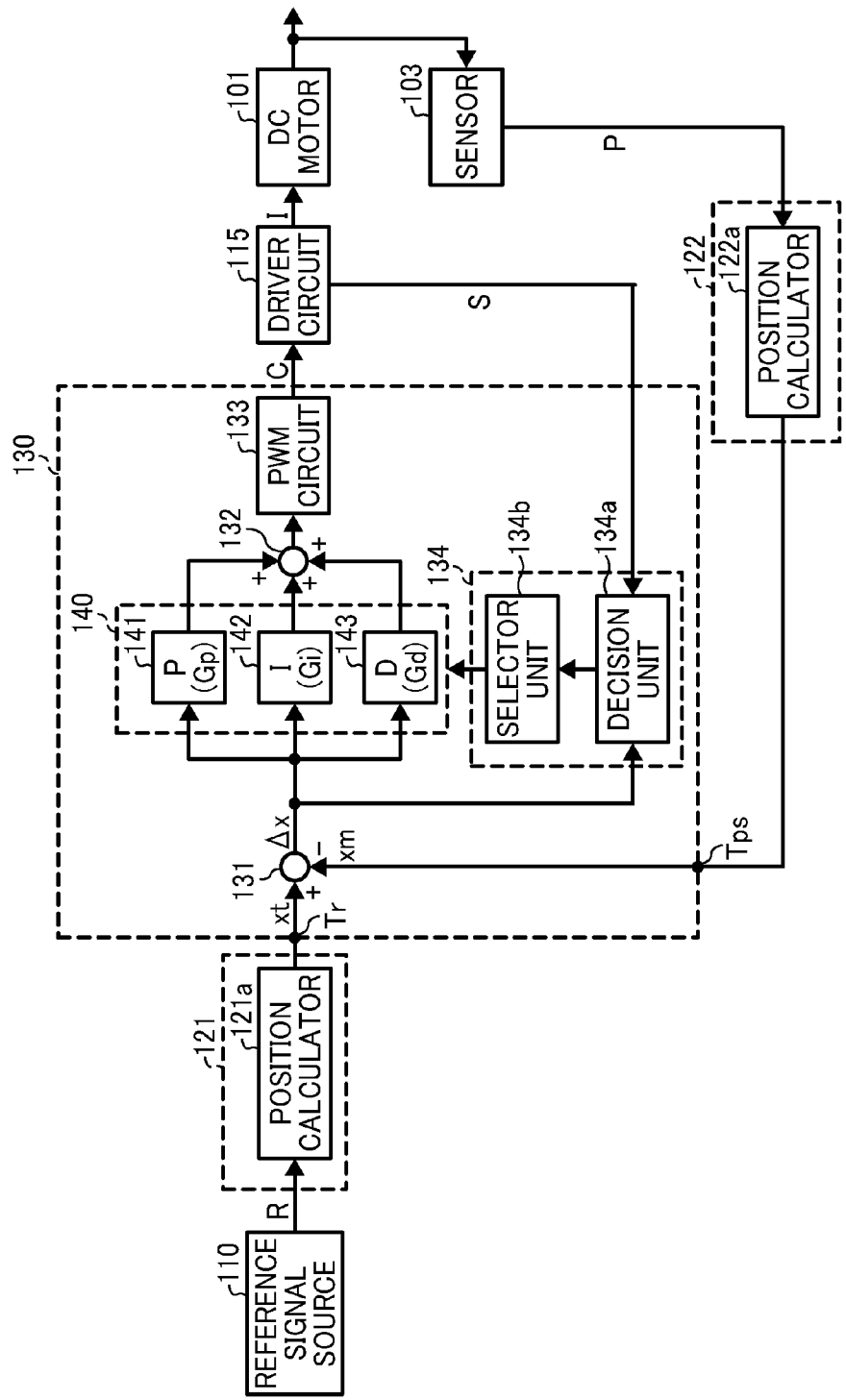
FIG. 7 is a block diagram of a control circuit of the BLDC motor system according to a first embodiment of this patent specification.

FIG. 7 is a block diagram of the control circuit 130 of the BLDC motor system 150 according to a first embodiment of this patent specification.

As shown in FIG. 7, the control circuit 130 includes a position sensor terminal Tps connected to the position sensor 103 to receive a feedback signal xm indicating the measured rotational position of the motor shaft 102; a reference terminal Tr connected to the reference signal source 110 to receive a reference signal xt indicating a targeted rotational position of the motor shaft 102; a differential calculator 131 connected to the sensor terminal Ts and the reference terminal Tr to generate an error signal Δx representing a difference between the measured and targeted rotational positions of the motor shaft 102 based on the feedback signal xm and the reference signal xt; and a controller 140 connected to the differential calculator 131 to generate the control signal C based on the error signal Δx through a combination of control actions, including at least a proportional action and an integral action employing a proportional gain and an integral gain, respectively.

Specifically, in the present embodiment, the reference terminal Tr is connected to the reference signal source 110 through a position calculator 121a included in the reference signal processor 121, which generates the position reference signal xt representing a targeted rotational position in terms of cumulative distance to be travelled by the motor shaft 102.

The position sensor terminal Tps is connected to the position sensor 103 through a position calculator 122a included in the sensor signal processor 122, which generates the position feedback signal xm representing a measured rotational position in terms of cumulative distance travelled by the motor shaft 102.

The differential calculator 131 comprises a subtractor that subtracts the feedback signal xm from the reference signal xt to yield an error signal Δx representing a difference between the targeted and measured positions of the motor shaft 102.

The controller 140 comprises a PID controller formed of a proportional (P) controller 141 that outputs the error Δx multiplied by a proportional gain Gp to provide a proportional action; an integral (I) controller 142 that outputs a time-integral of the error Δx multiplied by an integral gain Gi to provide an integral action; and a derivative (D) controller 143 that outputs a time-derivative of the error Δx multiplied by a derivative gain Gd to provide a derivative action Although the controller 140 in the present embodiment is configured as a PID controller which minimizes the error through a combination of three control actions, the configuration of the controller 140 is not limited to that depicted in FIG. 7, and may include any type of feedback controller that generates a control signal based on calculation using a control gain. Also, although the PID control in the present embodiment is directed to the difference Δx between the measured and targeted rotational positions of the motor shaft 102, the control circuit 130 may perform feedback control on the difference Δv between the measured and targeted rotational speeds of the motor shaft 102.

The three outputs of the PID controller 140 are connected to an adder 132 that sums up the proportional, integral, and derivative actions to output a duty signal representing a duty cycle of a PWM signal. The duty signal is forwarded to a PWM circuit 133, which outputs a pulse width-modulated signal based on the input duty cycle, which constitutes the control signal C of the control circuit 130 to be output to the driver circuit 115.

The driver circuit 115 supplies power or electric current I to the motor 101 according to the control signal C from the PWM circuit 133. For example, the driver circuit 115 may be formed of a plurality of transistors each of which switches on and off according to the control signal C to generate a pulse signal based on which the power supply to the motor 101 is regulated.

With continued reference to FIG. 7, the control circuit 130 is shown further including a gain adjuster 134 connected to the controller 140 to adjust the gain of each control action to a first value where the motor 101 is in the steady operational state thereof, and to a second value different from the first value where the motor 101 is in the temporary, hold state thereof.

As used herein, the term "first gain" or "first value" of the gain of a control action refers to an optimized gain or tuning parameter of a feedback controller, which, when applied to the controller, allows for motor operation according to a targeted control sequence where the motor is in the steady operational state, the ramp-up state, or the ramp-down state thereof. Also, the term "second gain" or "second value" of the gain of a control action refers to a modified gain or tuning parameter of a feedback controller, which, when applied to the controller, reduces responsiveness to a positional error of the motor shaft present where the motor is in the hold state thereof.

Specifically, in the present embodiment, the gain adjuster 134 includes a decision unit 134a connected to the subtractor 131 and the driver circuit 115 to determine the time at which to perform gain adjustment, and a selector unit 134b connected between the decision unit 134a and the controller 140 to switch the gain of each control action according to determination by the decision unit 134a. A suitable memory is provided in the gain adjuster 134, which stores first and second values for each of the PID gains Gp, Gi, and Gd for retrieval by the selector unit 134b.

The driver circuit 115 is configured to output a status signal S to the decision unit 134a. This status signal S indicates where the pulsed signal output from the drive circuit 115 stops pulsing, which in turn indicates transition of the motor operational state from the steady operational state to the ramp-down state and then to the hold state. The status signal S also indicates where the pulsed signal output from the drive circuit 115 starts pulsing, which in turn indicates transition of the motor operational state from the hold state to the ramp-up state and then to the steady operational state.

Upon receiving the error signal Δx from the subtractor 131 and the status signal S from the driver circuit 115, the decision unit 134a triggers the selector unit 134b to perform gain adjustment depending on the operational state of the motor 101.

Figure 8:
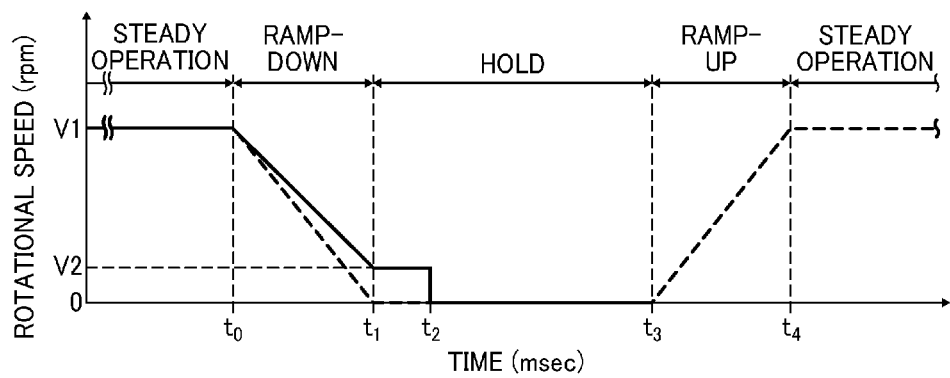
FIG. 8 is a graph showing a measured rotational speed, in rpm, of the BLDC motor, obtained in the BLDC motor system of FIG. 7.

FIG. 8 is a graph showing a measured rotational speed (solid line), in rpm, of the BLDC motor 101, plotted along with a targeted rotational speed (broken line), obtained in the BLDC motor system 150, wherein the motor 101 changes its operational state from the steady operational state to the ramp-down state and then to the hold state.

As shown in FIG. 8, before time t0, the motor 101 in the steady operational state rotates at a rated constant speed V1. At time t0, the motor 101 switches from the steady operational state to the ramp-down state in which the rotational speed of the motor 101 gradually decreases from the rated speed V1 toward zero. At time t1, the motor 101 reaches the hold state with its rotational speed remaining at a level V2 slightly higher than zero where a difference exists between the targeted and measured positions of the motor shaft 102.

After the motor 101 enters its hold state, at time t2, the gain adjuster 134 adjusts the gain of each control action from the first value to the second value. Application of the second gains temporarily reduces responsiveness to the positional error of the motor shaft 102, in which the resultant control actions do not cause the motor 101 to move or oscillate, resulting in the rotational speed of the motor 101 reduced to zero. After time t2, the motor rotational speed remains zero as long as the motor 101 remains in its hold state.

Thus, the control circuit 130 can immediately stop motor oscillations in the hold state of the motor 101 where there is a difference between the targeted and measured positions of the motor shaft, wherein the gain adjuster 134 adjusts the gain of each control action from the first gain to the second gain as the motor 101 changes its operational state from the steady operational state to the hold state.

In the present embodiment, the second value of the gain of each control action is lower than the first value, so that the combination of control actions employing the second values does not cause a movement of the motor 101 in the hold state. Suitable values of these control gains may be obtained through experiments or by calculation. For example, the first and second values of each control gain is determined relative to each other, such that the ratio of the second value with respect to the first value is ½ for the proportional gain, ¼ for the integral gain, and ½ for the derivative gain, respectively.

Further, in the present embodiment, the gain adjuster 134 changes the gain from the first value to the second value where one or more criteria have been met since the motor 101 entered its hold state.

Specifically, for example, the decision unit 134a may trigger the selector unit 134b to perform gain adjustment where a predetermined time limit has elapsed since entry of the motor 101 into the hold state thereof. With reference to FIG. 8, in such cases, the predetermined time limit is a period of time elapsed between time t1 and time t2.

Alternatively, instead, the decision unit 134a may trigger the selector unit 134b to perform gain adjustment where the difference between the measured and targeted rotational positions of the motor shaft 102 falls below a first threshold since entry of the motor 101 into the hold state thereof. With reference to FIG. 8, in such cases, the first threshold of the positional difference is reached at time t2 for the first time since time t1.

Still alternatively, instead, the decision unit 134a may trigger the selector unit 134b to perform gain adjustment where a predetermined time limit has elapsed since entry of the motor 101 into the hold state thereof, and the difference between the targeted and measured positions of the motor shaft 102 falls below a first threshold since entry of the motor 101 into the hold state thereof.

In the present embodiment, the gain adjuster 134 changes the gain of each control action from the second value to the first value where the motor 101 enters a ramp-up state thereof in which the rotational speed of the motor 101 increases from zero to a given rotational speed.

Figure 9:
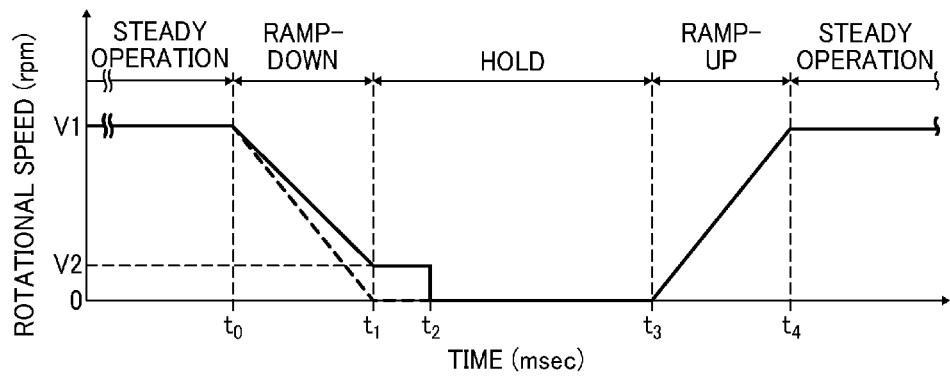
FIG. 9 is another graph showing a measured rotational speed, in rpm, of the BLDC motor, obtained in the BLDC motor system of FIG. 7.

Specifically, with reference to FIG. 9, after adjustment of the gain from the first value to the second value at time t2, the rotational speed of the motor 101 remains zero as long as the motor 101 remains in its hold state. Then, at time t3, the motor 101 enters the ramp-up state in which the rotational speed of the motor 101 gradually increases from zero to the rated speed V1. Entry of the motor 101 into the ramp-up state is detected by the gain adjuster 134, which in turn adjusts the gain from the second value to the first value. Changing the gain from the second value to the original, first value increases responsiveness to a positional error of the motor shaft 102, so that the motor 101 reliably follows a targeted control sequence after entry into its ramp-up state. At time t4, the rotational speed of the motor 101 reaches the original level V1 as the motor 101 enters its steady operational state.

Figure 10:
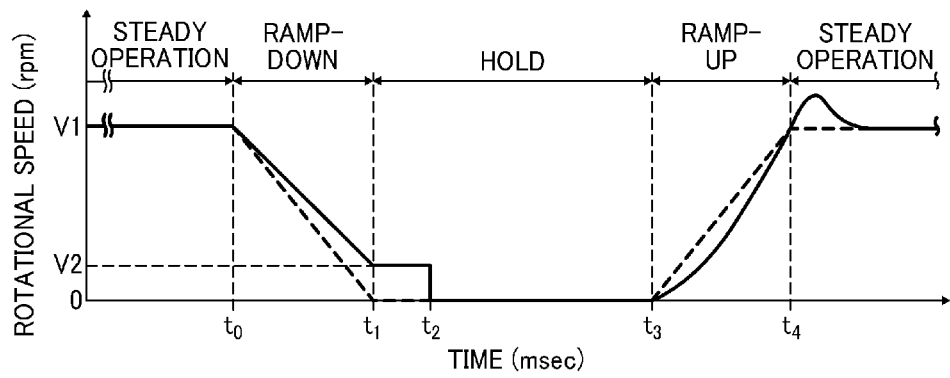
FIG. 10 is a graph showing a measured rotational speed, in rpm, of a BLDC motor, obtained in a BLDC motor system.

For comparison purposes, and for facilitating understanding of gain adjustment according to this patent specification, consider a case in which no gain adjustment is performed to restore the gain from the second value to the first value upon entry of the motor into the ramp-up state thereof, with reference to FIG. 10.

As shown in FIG. 10, with the gain of a control action remaining at the second value after time t3, the rotational speed of the motor would increase slower than targeted, and eventually exceed the targeted rotational speed after time t4. Such overshoot in the motor rotational speed translates into a lack of coordination between motor-driven imaging units (e.g., a speed difference between an intermediate transfer belt and a media conveyance mechanism), which would lead to inconsistent imaging quality of the image forming apparatus.

By contrast, the control circuit 130 enables the motor 101 to reliably follow a targeted control sequence upon entry into the ramp-up state thereof without overshoot in the rotational speed and concomitant miscoordination in the imaging equipment, wherein the gain adjuster 134 adjusts the gain of each control action from the second gain to the original, first gain as the motor 101 enters the ramp-up state from the hold state thereof.

In the present embodiment, the gain adjuster 134 may detect a change in the motor operational state based on the error signal Δx from the subtractor 131 or on the status signal S from the driver circuit 115.

Specifically, the decision unit 134a may trigger the selector unit 134 to adjust the gain from the second value to the first value as it detects entry of the motor 101 into the ramp-up state based on the error signal Δx indicating that the difference between the measured and targeted rotational positions of the motor shaft 102 exceeds a second threshold. The second threshold difference may be set to a suitable range obtained through experiments or by calculation, so as to accommodate displacement of the motor in the hold state due to possible disturbance events. For example, the threshold may be set to ±2 pulses where the motor can be displaced by ±1 pulse from its original position under the influence of an external force.

Alternatively, instead, the decision unit 134a may trigger the selector unit 134 to adjust the gain from the second value to the first value as it detects entry of the motor 101 into the ramp-up state based on the status signal S from the driver circuit 115 indicative of an operational state of the motor 101.

Figure 11:
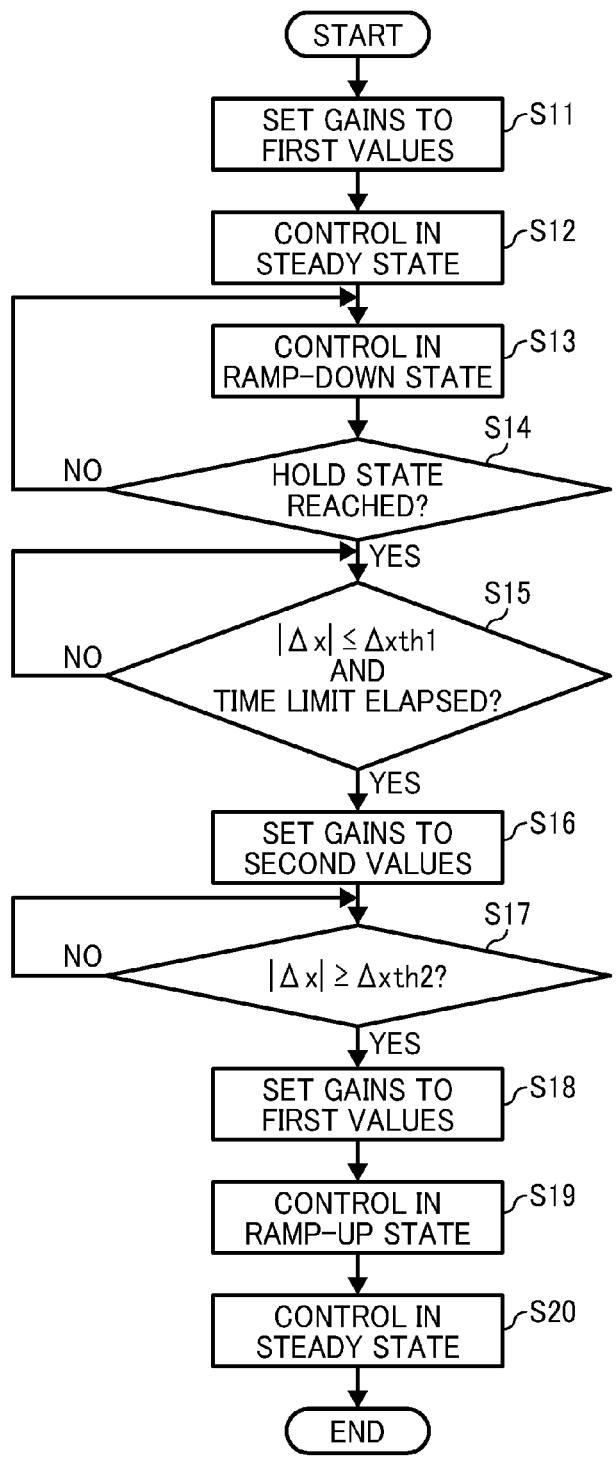
FIG. 11 is a flowchart illustrating motor control in the BLDC motor system according to the first embodiment of this patent specification.

FIG. 11 is a flowchart illustrating motor control in the BLDC motor system 150 according to the first embodiment of this patent specification.

As shown in FIG. 11, upon activation of the system 150, the decision unit 134a of the gain adjuster 134 directs the selector unit 134b to initially set the respective gains Gp, Gi, and Gd to their first values (step S11).

With the PID controller 140 thus initialized, the control circuit 130 controls the motor 101 in the steady operational state (step S12), and then in the ramp-down state (step S13) according to a predetermined control sequence.

Upon entry of the motor 101 into the ramp-down state thereof, the decision unit 134a of the gain adjuster 134 determines whether the motor 101 reaches the hold state thereof based on the status signal S from the driver circuit 115 (step S14).

Where the hold state is not reached ("NO" in step S14), the operation goes back to step S13. Where the hold state is reached ("YES" in step S14), the decision unit 134a of the gain adjuster 134 then determines whether criteria are met for executing gain adjustment. In the present embodiment, these criteria include whether a predetermined time limit has elapsed since entry of the motor 101 into the hold state thereof, and whether an absolute value of difference |Δx| between the targeted and measured positions of the motor shaft 102 equals or falls below a first threshold Δxth1 since entry of the motor 101 into the hold state thereof (step S15).

As long as the gain adjustment criteria are not met ("NO" in step S15), the decision unit 134a repeats the determination process. Where the gain adjustment criteria are met ("YES" in step S15), the decision unit 134a directs the selector unit 134b to set the respective gains Gp, Gi, and Gd to their second values (step S16). Application of the second gains temporarily reduces responsiveness to the positional error of the motor shaft 102, in which the resultant control actions do not cause the motor 101 to move or oscillate as it remains in the hold state thereof.

After gain adjustment, the gain adjuster 134 determines whether the motor 101 changes the operational state from the hold state to the ramp-up state. In the present embodiment, for example, the decision unit 134a of the gain adjuster 134 detects entry of the motor 101 into the ramp-up state thereof where an absolute value of difference |Δx| between the targeted and measured positions of the motor shaft 102 equals or exceeds a second threshold Δxth2 (step S17).

As long as the second threshold Δxth2 is not exceeded ("NO" in step S17), the decision unit 134a repeats the determination process. Where the second threshold Δxth2 is exceeded ("YES" in step S17), the decision unit 134a directs the selector unit 134b to set the respective gains Gp, Gi, and Gd to their first, original values (step S18).

With the PID controller 140 thus re-initialized, the control circuit 130 controls the motor 101 in the ramp-up state thereof (step S19), and then in the steady operational state thereof (step S20) according to the control sequence.

Hence, the BLDC motor system 150 according to the first embodiment of this patent specification can effectively stabilize operation of the PID-controlled motor 101 in the hold state thereof, owing to the gain adjustment capability which changes the gain of a control action from the first value to the second value as the motor 101 enters the hold state from the steady operational state, thereby immediately stopping motor oscillations in the presence of a difference between the targeted and measured positions of the motor shaft.

Moreover, the system 150 can effectively stabilize operation of the motor upon entry into the ramp-up state thereof, owing to the gain adjustment capability which adjusts the gain of a control action from the second value to the original, first value as the motor 101 enters the ramp-up state from the hold state thereof, so that the motor 101 can reliably follow a targeted control sequence without overshoot in the rotational speed and concomitant miscoordination in the motor-driven imaging equipment.

Figure 12:
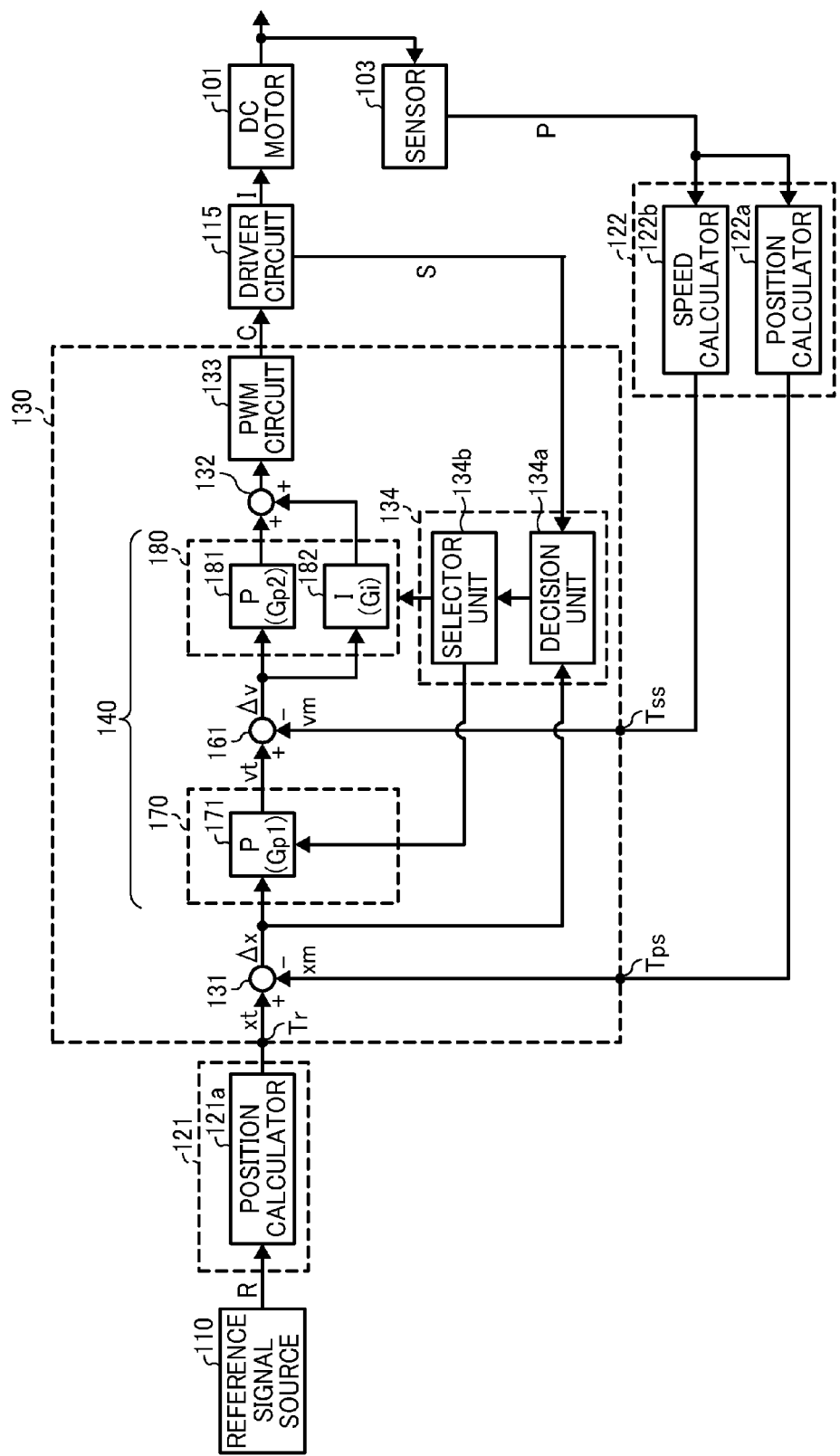
FIG. 12 is a block diagram of a control circuit of the BLDC motor system according to a second embodiment of this patent specification.

FIG. 12 is a block diagram of the control circuit 130 of the BLDC motor system 150 according to a second embodiment of this patent specification.

As shown in FIG. 12, the overall configuration of the present embodiment is similar to that depicted primarily with reference to FIG. 7. Unlike the first embodiment, in the second embodiment, the controller 140 comprises a P-PI cascade controller, instead of a PID controller, and the control circuit 130 further includes a speed sensor terminal Tss connected to the position sensor 103 to receive a feedback signal vm indicating the measured rotational speed of the motor shaft 102, and an additional differential calculator 161 connected to the speed sensor terminal Tss to generate an error signal Δv representing a difference between the measured and targeted rotational speeds of the motor shaft based on the feedback signal vm and an output of the controller 140.

Specifically, in the present embodiment, the speed sensor terminal Tss is connected to a speed calculator 122b included in the sensor signal processor 122, which generates the speed feedback signal vm representing a measured rotational speed in terms of number of revolutions per unit time made by the motor shaft 102.

The controller 140 includes a combination of a proportional (P) controller 170 and a proportional-integral (PI) controller 180 connected in series with the differential calculator 161 interposed between the P and PI controllers 170 and 180.

The P controller 170 multiplies the error Δx by a proportional gain Gp1 to generate a speed reference signal vt indicating a targeted rotational speed of the motor shaft 102.

The differential calculator 161 comprises a subtractor that subtracts the feedback signal vm from the reference signal vt to yield an error signal Δv representing a difference between the targeted and measured speeds of the motor shaft 102.

The PI controller 180 includes a proportional (P) controller 181 that outputs the error Δv multiplied by a proportional gain Gp2 to provide a proportional action, and an integral (I) controller 182 that outputs a time-integral of the error Δv multiplied by an integral gain Gi to provide an integral action.

The two outputs of the PI controller 180 are connected to the adder 132 that sums up the proportional and integral actions to output a duty signal representing a duty cycle of a PWM signal. The duty signal is forwarded to the PWM circuit 133, which outputs a pulse width-modulated signal based on the input duty cycle, which constitutes the control signal C of the control circuit 130 to be output to the driver circuit 115.

In such a configuration, the system 150 according to the second embodiment operates in a manner similar to that depicted in the foregoing embodiment, wherein the gain adjuster 134, connected to both of the P controller 170 and the PI controller 180, adjusts the gain of each control action to a first value where the motor 101 is in the steady operational state thereof, and to a second value different from the first value where the motor 101 is in the hold state thereof. Also, the gain adjuster 134 may change the gain of each control action from the second value to the first value where the motor 101 enters a ramp-up state thereof in which the rotational speed of the motor 101 increases from zero to a given rotational speed.

Hence, the BLDC motor system 150 according to the first embodiment of this patent specification can effectively stabilize operation of the P-PI-controlled motor 101 in the hold state thereof, owing to the gain adjustment capability which changes the gain of a control action from the first value to the second value as the motor 101 enters the hold state from the steady operational state, thereby immediately stopping motor oscillations in the presence of a difference between the targeted and measured positions of the motor shaft.

Moreover, the system 150 can effectively stabilize operation of the motor upon entry into the ramp-up state thereof, owing to the gain adjustment capability which adjusts the gain of a control action from the second value to the original, first value as the motor 101 enters the ramp-up state from the hold state thereof, so that the motor 101 can reliably follow a targeted control sequence without overshoot in the rotational speed and concomitant.

Figure 13:
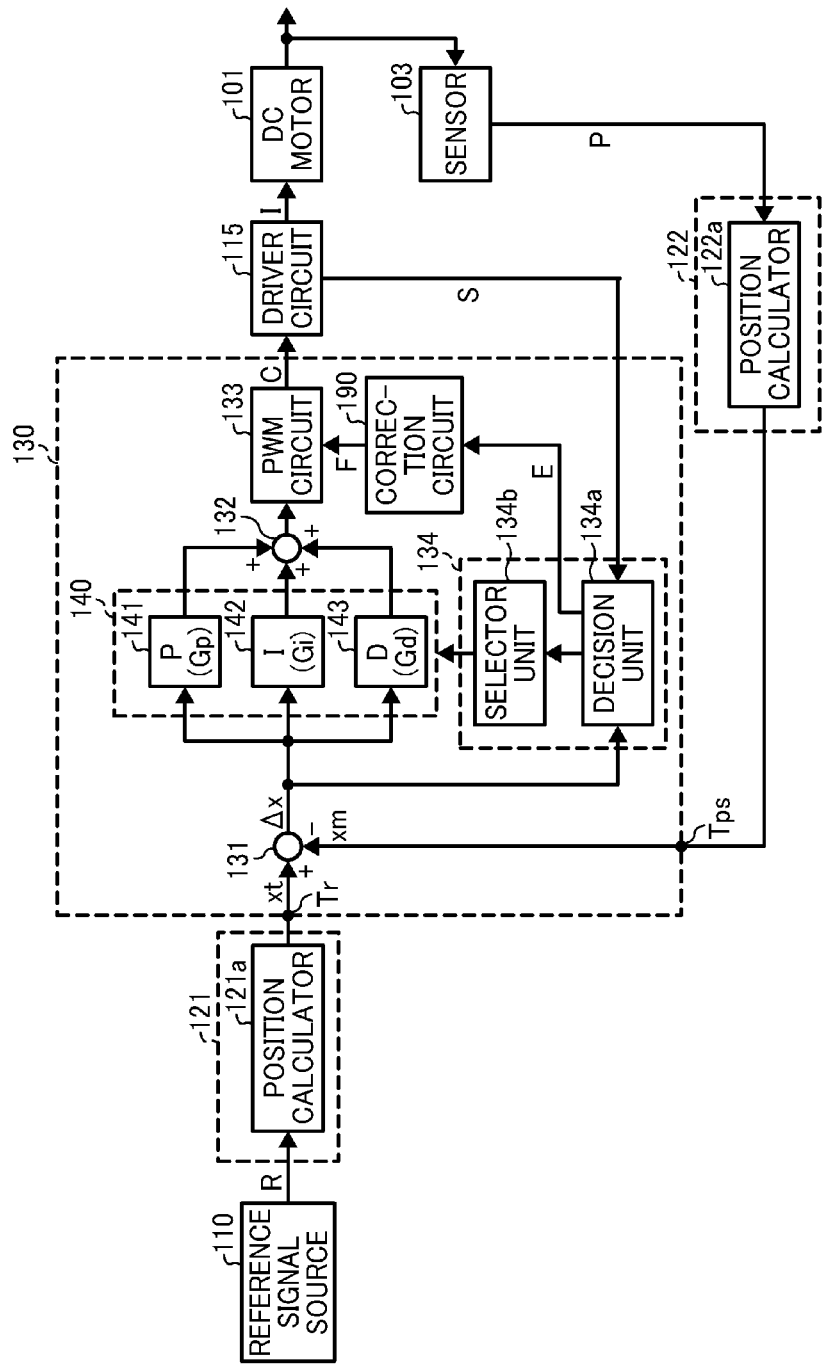
FIG. 13 is a block diagram of a control circuit of the BLDC motor system according to a third embodiment of this patent specification.

FIG. 13 is a block diagram of the control circuit 130 of the BLDC motor system 150 according to a third embodiment of this patent specification.

As shown in FIG. 13, the overall configuration of the present embodiment is similar to that depicted primarily with reference to FIG. 7. Unlike the first embodiment, in the third embodiment, the control circuit 130 includes a correction circuit 190 connected between the gain adjuster 134 and the driver circuit 115 to correct for the difference between the measured and targeted rotational positions of the motor shaft 102 upon entry of the motor 101 into the ramp-up state thereof.

Specifically, in the present embodiment, the decision unit 134a of the gain adjuster 134 records an amount of positional difference between the measured and targeted rotational positions of the motor shaft 102 which remains after the motor 101 stops rotation in its hold state, and outputs an error signal E representing the recorded differential to the correction circuit 190.

Figure 14:
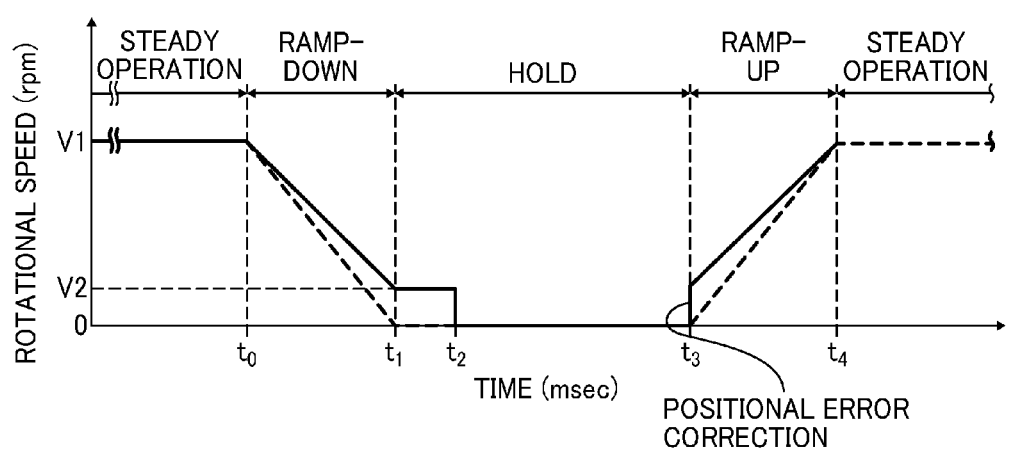
FIG. 14 is a graph showing a measured rotational speed, in rpm, of the BLDC motor, obtained in the BLDC motor system of FIG. 13.

The correction circuit 190 generates a feed-forward control signal F based on the error signal E from the gain adjuster 134, and transmits it to the PWM circuit 133 after the gain adjuster 134 resets the gain from the second value to the first value at the end of the motor hold state. The feed-forward control signal F thus input to the PWM circuit 133 causes the rotational speed of the motor 101 to rise instantaneously upon entry of the motor 101 into the ramp-up state, as shown in FIG. 14. Such correction to the positional error upon entry of the motor 101 into the ramp-up state allows the motor to more reliably follow a targeted control sequence without overshoot in the motor rotational speed.

Figure 15:
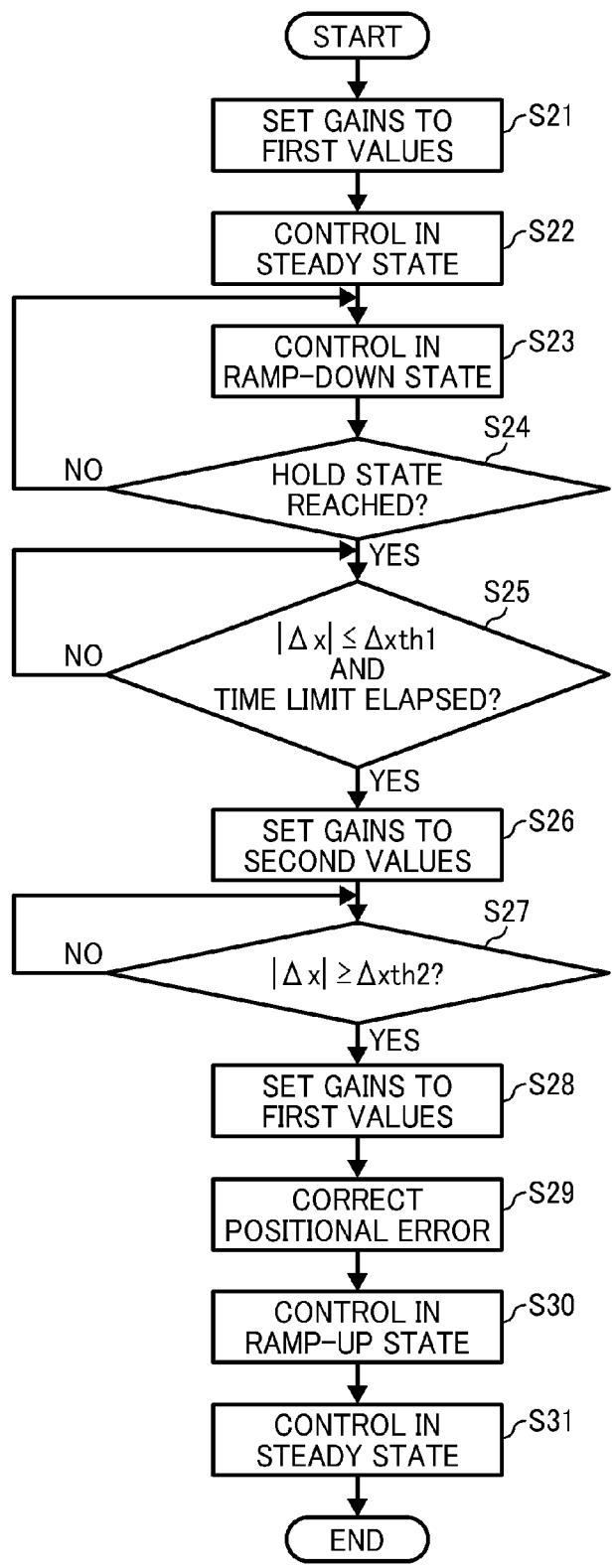
FIG. 15 is a flowchart illustrating motor control in the BLDC motor system according to the third embodiment of this patent specification.

FIG. 15 is a flowchart illustrating motor control in the BLDC motor system 150 according to the third embodiment of this patent specification.

As shown in FIG. 15, the operation performs a series of procedures S21 through S28 similar to those described in steps S11 through S18 in FIG. 11, of which a further description is omitted for brevity.

After the decision unit 134a of the gain adjuster 134 directs the selector unit 134b to set the respective gains Gp, Gi, and Gd to their first, original values (step S28), the correction circuit 190 outputs a feed-forward control signal F to the PWM circuit 133, which corrects the positional error upon entry of the motor 101 into the ramp-up state (step S29).

Thereafter, the control circuit 130 controls the motor 101 in the ramp-up state (step S30), and then in the steady operational state (step S31) according to the control sequence.

Hence, the BLDC motor system 150 according to the third embodiment of this patent specification can effectively stabilize operation of the PID-controlled motor 101 in the hold state thereof, owing to the gain adjustment capability which changes the gain of a control action from the first value to the second value as the motor 101 enters the hold state from the steady operational state, thereby immediately stopping motor oscillations in the presence of a difference between the targeted and measured positions of the motor shaft.

Moreover, the system 150 can effectively stabilize operation of the motor upon entry into the ramp-up state thereof, owing to the gain adjustment capability which not only adjusts the gain of a control action from the second value to the original, first value, but also corrects for the positional error as the motor 101 enters the ramp-up state from the hold state, so that the motor 101 can more reliably follow a targeted control sequence without overshoot in the rotational speed and concomitant miscoordination in the motor-driven imaging equipment.

To recapitulate, an electric motor system 150 according to several embodiments of this patent specification includes a brushless direct-current motor 101 having an output shaft 102 for transmitting torque; a driver circuit 115 connected to the motor 101 to supply power to the motor according to a control signal C input thereto; a position sensor 103 adjacent to the motor 101 to measure an angular, rotational position of the motor shaft 102; and a control circuit 130 connected between the position sensor 103 and the driver circuit 115 to control operation of the motor 101.

The control circuit 130 includes a position sensor terminal Tps connected to the position sensor 103 to receive a feedback signal xm indicating the measured rotational position of the motor shaft; a reference terminal Tr connected to a reference signal source 110 to receive a reference signal xt indicating a targeted rotational position of the motor shaft 102; a differential calculator 131 connected to the position sensor terminal Tps and the reference terminal Tr to generate an error signal Δx representing a difference between the measured and targeted rotational positions of the motor shaft 102 based on the feedback signal xm and the reference signal xt; a controller 140 connected to the differential calculator 131 to generate the control signal C based on the error signal through a combination of control actions, including at least a proportional action and an integral action employing a proportional gain and an integral gain, respectively; and a gain adjuster 134 connected to the controller 140 to adjust the gain of each control action to a first value where the motor 101 is in the steady operational state thereof, and to a second value different from the first value where the motor 101 is in the hold state thereof.

Provision of the gain adjustment capability in the BLDC motor system 150 enables stable, oscillation-free operation of the motor 101 in the hold state thereof in the presence of a difference between the targeted and measured positions of the motor shaft. Incorporation of such an electric motor system 150 in an image forming apparatus 100 allows for coordinated operation between motor-driven members in imaging equipment, such as a feed roller, a registration roller, a transfer roller, an output roller, and a belt supporting roller, or those included in a photoconductor device, an exposure device, and a development device, leading to excellent imaging quality of the image forming apparatus 100. The electric motor system 150 is applicable to various types of image forming apparatuses, such as photocopiers, facsimile machines, printers, plotters, or multifunctional machines incorporating several of those imaging functions.

Figure 16:
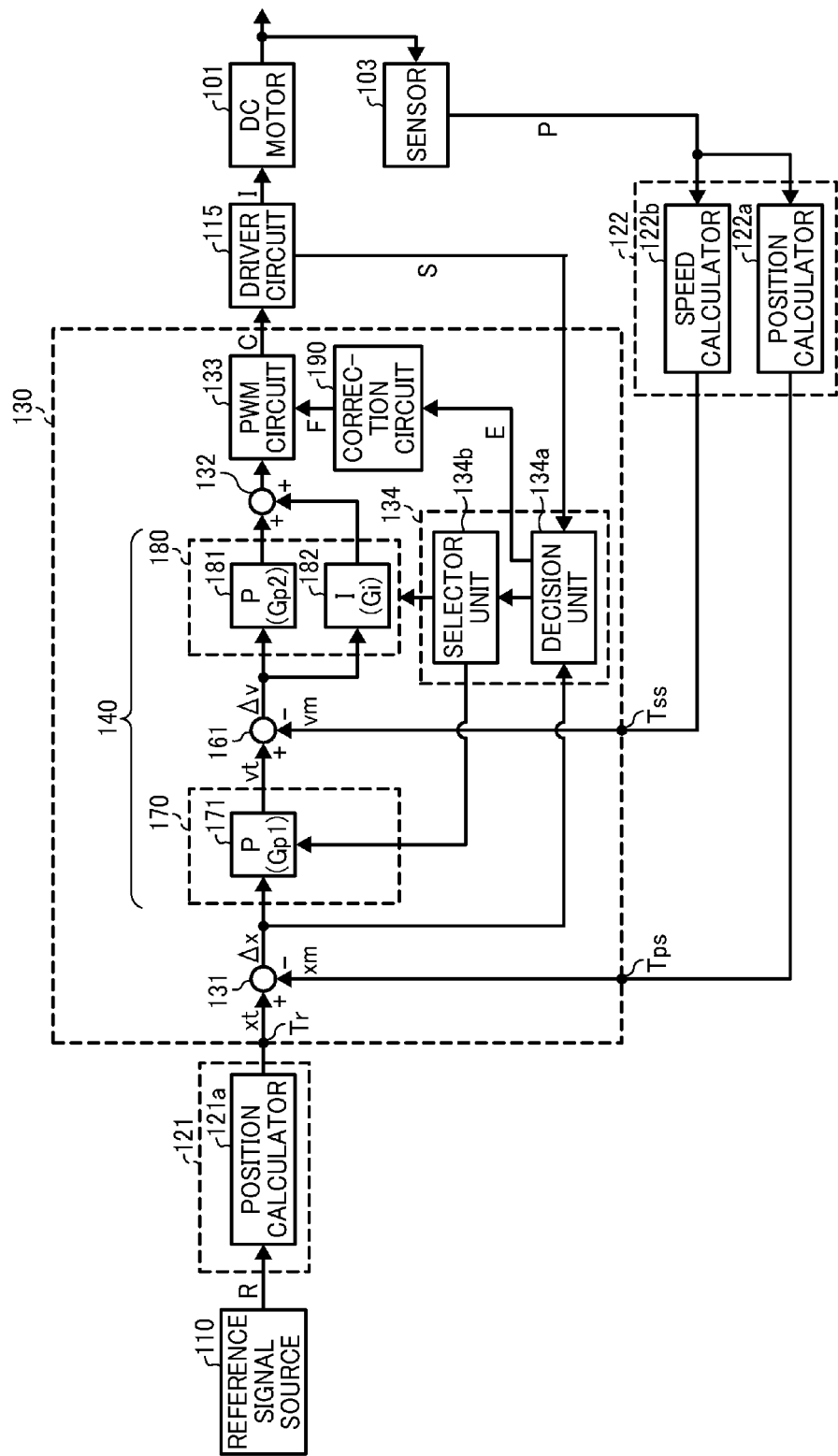
FIG. 16 is a block diagram of a control circuit of the BLDC motor system according to a further embodiment of this patent specification.

Numerous additional modifications and variations are possible in light of the above teachings. In a further embodiment, for example, instead of a PID controller in conjunction with a correction circuit, the control circuit may employ a P-PI controller in conjunction with a correction circuit, as shown in FIG. 16. It is therefore to be understood that, within the scope of the appended claims, the disclosure of this patent specification may be practiced otherwise than as specifically described herein.

What is claimed is:

1. An electric motor system comprising:
   a brushless direct-current motor having an output shaft for transmitting torque,
   the motor rotating at a given rotational speed in a steady operational state thereof, and stopping rotation while being energized in a temporary, hold state thereof;

a driver circuit connected to the motor to supply power to the motor according to a control signal input thereto;

a position sensor adjacent to the motor to measure an angular, rotational position of the motor shaft; and a control circuit connected between the position sensor and the driver circuit to control operation of the motor, the control circuit including:

a position sensor terminal connected to the position sensor to receive a feedback signal indicating the measured rotational position of the motor shaft;

a reference terminal connected to a reference signal source to receive a reference signal indicating a targeted rotational position of the motor shaft;

a differential calculator connected to the position sensor terminal and the reference terminal to generate an error signal representing a difference between the measured and targeted rotational positions of the motor shaft based on the feedback signal and the reference signal;

a controller connected to the differential calculator to generate the control signal based on the error signal through a combination of control actions, including at least a proportional action and an integral action employing a proportional gain and an integral gain, respectively; and a gain adjuster connected to the controller to adjust the gain of each control action to a first value where the motor is in the steady operational state thereof, and to a second value different from the first value where the motor is in the hold state thereof.

2. The system according to claim 1, wherein the gain adjuster changes the gain from the first value to the second value where a predetermined time limit has elapsed since entry of the motor into the hold state thereof.

3. The system according to claim 1, wherein the gain adjuster changes the gain from the first value to the second value where the difference between the measured and targeted rotational positions of the motor shaft falls below a first threshold since entry of the motor into the hold state thereof.

4. The system according to claim 1, wherein the gain adjuster changes the gain from the first value to the second value where a predetermined time limit has elapsed since entry of the motor into the hold state thereof, and the difference between the measured and targeted rotational positions of the motor shaft falls below a first threshold since entry of the motor into the hold state thereof.

5. The system according to claim 1, wherein the gain adjuster changes the gain of each control action from the second value to the first value where the motor enters a ramp-up state thereof in which the rotational speed of the motor increases from zero to a given rotational speed.

6. The system according to claim 5, wherein the gain adjuster detects entry of the motor into the ramp-up state thereof based on the error signal indicating that the difference between the measured and targeted rotational positions of the motor shaft exceeds a second threshold.

7. The system according to claim 5, wherein the gain adjuster detects entry of the motor into the ramp-up state thereof based on an output signal from the driver circuit indicative of an operational state of the motor.

8. The system according to claim 5, further comprising a correction circuit connected between the gain adjuster and the driver circuit to correct the control signal for the difference between the measured and targeted rotational positions of the motor shaft upon entry of the motor into the ramp-up state thereof.

9. The system according to claim 1, wherein the second value of the gain of each control action is lower than the first value, so that the combination of control actions employing the second values does not cause a movement of the motor in the hold state thereof.

10. The system according to claim 1, wherein the controller comprises a P-PI controller, with the combination of control actions further including an additional proportional action in addition to the proportional action and the integral action.

11. The system according to claim 1, wherein the controller comprises a PID controller, with the combination of control actions further including a derivative action employing a derivative gain in addition to the proportional action and the integral action.

12. The system according to claim 11, wherein a ratio of the second value with respect to the first value is ½ for the proportional gain, ¼ for the integral gain, and ½ for the derivative gain, respectively.

13. An image forming apparatus incorporating the system according to claim 1, wherein the motor drives a roller selected from the group consisting of a feed roller, a registration roller, a transfer roller, an output roller, a belt supporting roller, and combinations thereof.

14. An image forming apparatus incorporating the system according to claim 1, the apparatus comprising:

a photoconductor device defining a photoconductive surface for forming a toner image thereon;

an exposure device with a light source directed to the photoconductor to irradiate the photoconductive surface with light to form an electrostatic latent image thereon; and a development device adjacent to the photoconductor to render the electrostatic latent image into a visible, toner image, wherein the motor drives a rotary member included in at least one of the photoconductor device, the exposure device, and the development device.

15. A method for controlling operation of a brushless direct-current motor having an output shaft for transmitting torque, the motor rotating at a given rotational speed in a steady operational state thereof, and stopping rotation while being energized in a hold state thereof, the method comprising:

acquiring a measured rotational position of the motor shaft;

acquiring a targeted rotational position of the motor shaft;

calculating a difference between the measured and targeted rotational positions of the motor shaft;

generating a control signal based on the calculated difference through a combination of control actions, including at least a proportional action and an integral action employing a proportional gain and an integral gain, respectively;

supplying power to the motor according to the control signal; and adjusting the gain of each control action to a first value where the motor is in the steady operational state thereof, and to a second value different from the first value where the motor is in the hold state thereof.

16. A circuit for controlling operation of a brushless direct-current motor having an output shaft for transmitting torque, the motor rotating at a given rotational speed in a steady operational state thereof, and stopping rotation while being energized in a hold state thereof, the circuit comprising:

means for supplying power to the motor according to a control signal;

means for acquiring a measured rotational position of the motor shaft;
means for acquiring a targeted rotational position of the motor shaft;
means for calculating a difference between the measured and targeted rotational positions of the motor shaft;
a PID controller to generate the control signal based on the calculated difference through a combination of control actions, including at least a proportional action and an integral action employing a proportional gain and an integral gain, respectively; and
a gain adjuster connected to the controller to adjust the gain of each control action to a first value where the motor is in the steady operational state thereof, and to a second value different from the first value where the motor is in the hold state thereof.

* * * * *